United States Patent
Lo

(10) Patent No.: US 6,729,246 B2
(45) Date of Patent: May 4, 2004

(54) INTERLINKED SYNTHETIC GARBAGE INCINERATOR WITH A PLURALITY OF INLETS

(76) Inventor: Koon Kwan Lo, Room 1710, Hing Cho House, Hing Tung Estate, Shaukiwan (HK)

( * ) Notice: Subject to any disclaimer, the term of this patent is extended or adjusted under 35 U.S.C. 154(b) by 0 days.

(21) Appl. No.: 10/226,501

(22) Filed: Aug. 23, 2002

(65) Prior Publication Data

US 2003/0037713 A1 Feb. 27, 2003

(30) Foreign Application Priority Data

Aug. 24, 2001 (HK) ............................................. 01105980

(51) Int. Cl.[7] ............................... F23G 5/04; F23G 7/04; F23B 1/12
(52) U.S. Cl. ..................... 110/233; 110/295; 110/224; 110/221; 110/238
(58) Field of Search ................................ 110/235, 295, 110/346, 347, 348, 190, 221, 223, 224, 238, 165 R, 233

(56) References Cited

U.S. PATENT DOCUMENTS

| | | | | |
|---|---|---|---|---|
| 2,873,702 A | * | 2/1959 | Schulte ........................ 110/101 |
| 3,859,174 A | * | 1/1975 | Taylor .......................... 203/10 |
| 3,916,806 A | * | 11/1975 | Giraud ......................... 110/14 |
| 4,646,661 A | * | 3/1987 | Roos et al. .................. 110/245 |
| 4,655,146 A | * | 4/1987 | Lemelson .................... 110/346 |
| 4,765,256 A | * | 8/1988 | Caughey ...................... 110/229 |
| 4,777,889 A | * | 10/1988 | Smith .......................... 110/245 |
| 4,813,360 A | * | 3/1989 | Poeppelman et al. ........ 110/259 |
| 4,838,183 A | * | 6/1989 | Tsaveras et al. ............. 110/190 |
| 4,932,336 A | * | 6/1990 | Srowig et al. ............... 110/346 |
| 5,067,425 A | * | 11/1991 | Sporleder ..................... 114/26 |
| 5,095,829 A | * | 3/1992 | Nevels ......................... 110/346 |
| 5,890,444 A | * | 4/1999 | Martin et al. ................ 110/346 |
| 6,199,491 B1 | * | 3/2001 | Wu .............................. 110/235 |
| 6,202,577 B1 | * | 3/2001 | Boguslavsky et al. ....... 110/346 |

FOREIGN PATENT DOCUMENTS

| | | | | |
|---|---|---|---|---|
| CN | 2254995 Y | * | 5/1997 | ............. F23G/5/04 |
| CN | 87216178 U | * | 9/1998 | ............. F23G/5/00 |
| CN | 2350637 Y | * | 11/1999 | ............. F23G/5/16 |

* cited by examiner

Primary Examiner—Kenneth Rinehart
(74) Attorney, Agent, or Firm—J.C. Patents

(57) ABSTRACT

A garbage incinerator comprises an incinerator body having an elongated incinerating chamber, which forms an angle with a horizontal plane. A plurality of inlets are provided on the incinerator body for feeding burnable construction garbage and house refuse, respectively. A plurality of house refuse drying channels are provided in the incinerating chamber for drying the house refuse received from the inlets. A waste oil burner is provided at the bottom of the incinerating chamber. Also provided are a dust-removing device for removing dust from exhaust of the incinerator and a harmful substance detecting device.

17 Claims, 4 Drawing Sheets

INTERLINKED SYNTHETIC GARBAGE INCINERATOR WITH A PLURALITY OF INLETS

FIELD OF THE INVENTION

The present invention relates to a garbage incinerator, and particularly to a synthetic incinerator which incinerates a large amount of refuse, waste oil, burnable construction wastes, and house refuse.

BACKGROUND OF THE INVENTION

With the development of economy and the increase of population in all countries of the world, environment pollution increasingly attracts people's attention, and the disposal of refuse has become one of the important problems that people are facing for eliminating the environment pollution. In order to improve human's life environment and avoid the harm of refuse to people's health and normal life, the disposal of refuse has been seriously studied. As to the commonly used refuse-burying method in the past for disposing city refuse, due to the fact that a lot of refuse can not decompose for decades, the water source can easily be polluted and plenty of farmland is occupied. In recent years, some techniques of incinerating refuse have been proposed. The specification of Chinese Utility Model CN87216178U published on Sep. 28, 1988 discloses a refuse waste incinerator which is applicable to the disposal of house and medical refuse. This incinerating equipment is comprised of an incinerator, a grinder, a lifting mechanism, and a second burning chamber, it is characterized by: in the incinerator there are a rotatable rake, a receiving stand and a stirring rake, the garbage can be evenly spread out and continuously incinerated; and the second burning chamber heats the gas discharged from the incinerator to a high temperature to reduce the harmful gas in the exhaust gas. The specification of the Chinese Utility Model CN2254995Y published on May 28, 1997 discloses a continuous garbage incinerator with tilted scrapers. The front portion of the incinerator body is supported by a stand to make the incinerator body form an angle of 35 to 40 degrees with respect to the horizontal plane; in the incinerator body there is mounted an electrically driven chain conveyer belt which has a chain, the upright rings of the chain are provided with scraper grates formed by welding two angles back to back with each other, and the scraper-grates are formed with a vent; and feed and discharge can be carried out continuously and it is not necessary for a second ignition. The specification of Chinese Utility Model CN2350637Y published on Nov. 24, 1999 discloses another backfire incinerator for continuously incinerating house refuse, which comprises a feeding system, a fuel (or electric) igniter, an electrically-driven pusher, a stepped tilted reciprocating fire grate, a flat chain fire grate and a second burning chamber; and further comprises a blower, a draught fan, a slag discharging device, a secondary dust-removing-by-water device, a chimney and etc. When incinerating the refuse, after a bottom fire layer is formed by an igniter, the refuse which has started to burn is pushed onto the stepped tilted reciprocating fire grate by the electrically driven pusher to be burned at a high temperature; the draught fan is provided in front of the incinerator to introduce smokey fire into a passage against the wind to enter the secondary incinerating chamber, the residual heat utilizing chamber, and two-stage dust-removing-by-water device; discharge of harmful gases can be reduced since the smoke, dust and odor are subject to a second-stage water treatment. All the above three utility models are aimed to solve the problem of refuse disposal through incinerating, but they all have the following disadvantages: 1. different kinds of garbage are not disposed separately, or only one kind of garbage can be disposed; 2. the incinerator body is small and garbage disposal can not be carried out on a large scale; 3. the exhaust gas stays in the incinerator for a short time, resulting in the generation of harmful substances such as dioxine and etc.

Also, the known incinerators have a high cost of manufacture, and can only incinerates a small amount of garbage, and can not deal with the problem of a large amount of garbage produced in modern cities. It is generally realized that if the exhaust gas generated by incinerating organ matters stays longer in the incinerating chamber and the unburned gas of organ matters is burned once again at a high temperature in the incinerating chamber, it is possible to avoid the generation of toxic substance (dioxine TCDD) and others. However, when incinerating garbage in the known incinerators, the unburned exhaust gas only stays in the incinerating chamber for a short time. As a result, when incinerating organ substances, toxic substance dioxine (PCDD) and other toxic substances are generated.

The progress of mankind and the development of science and technology have brought about great changes and conveniences in people's daily life, but have also produced many problems of environment pollution, such as large amount of refuse, waste oil of daily life, industrial waste oil, construction garbage, house refuse, chemical wastes, and etc. Therefore, it is an urgent problem to be solved at present to provide an interlinked synthetic garbage incinerator with a plurality of inlets which can incinerate a large amount of refuse and whose incinerating chamber can be extended according to the target amount of refuse to be disposed, so as to disposes a large amount of refuse, waste oil of daily life, industrial waste oil, contraction refuse, and etc.

SUMMARY OF THE INVENTION

The object of the present invention is to provide a garbage incinerator, which can separate and dispose different kinds of garbage, is continuously self-ignited, discharges harmlessly and can dispose garbage in large scale.

To achieve the above object of the present invention, there is provided an interlinked synthetic garbage incinerator with a plurality of inlets, which comprises an incinerator body, an incinerating chamber, a jet igniter and automatic pushers. The front portion of the incinerating body is supported by a stand to make the incinerating body form a certain angle with respect to the horizontal plane, and the internal cavity of the incinerator body forms an elongate incinerating chamber. The incinerator body can be designed to have adequate length. Outside the bottom of the incinerator body there is provided a waste oil tank, the waste oil is delivered from the waste oil tank to the incinerating chamber via a waste oil pipe. On the two sides of the incinerator body there are provided multiple pairs of inlets for the burnable construction garbage and multiple pairs of inlets for house refuse. In the incinerating chamber there are provided a plurality of drying channels for house refuse; and at the bottom of the incinerating chamber there is provided a waste oil burner of self-ignition and thermal gasification. At the underside of the incinerator body, under each burnable construction garbage inlet there are provided a slag eliminating device, a slag discharging outlet, an underground garbage-slag clearing channel. At the tail end of the incinerator, there are provided a gas discharging port, a dust-removing device, a harmful substance detecting device, and a smoke discharging port. And at the bottom of the incinerating chamber there is provided an incinerator opening.

Specifically, the front portion of the incinerator body is supported by a stand so that the body forms a certain angle with respect to the horizontal line. The incinerator body can be designed to have adequate length, the internal cavity of the incinerator body is an elongate incinerating chamber, and the incinerating chamber is constructed of the refectory material. Outside the bottom of the incinerator body there is a waste oil tank for containing waste oil of daily life and industrial waste oil, and the waste oil is delivered to the incinerating chamber from the waste oil tank through a waste oil pipe. The two sides of the incinerator body are provided with multiple pairs of burnable construction garbage inlets and multiple pairs of house refuse inlets. An incinerating bed is provided in the incinerating chamber between each pair of burnable construction garbage inlets. In the incinerating chamber there are provided a plurality of house refuse drying channels, the house refuse, after being dehydrated, is pushed into the house refuse inlets by an automatic pusher to fall on the house refuse drying channels; and the house refuse, after drying, slides down and falls on the incinerating bed in the incinerating chamber, and the water flowing out of the house refuse drying channels is collected in a house refuse waste water reservoir. The burnable construction garbage is pushed into the burnable construction garbage inlet by an automatic pusher, falling on the incinerating beds in the incinerating chamber. At the bottom of the incinerating chamber there is provided a waste oil burner of self-ignition and thermal gasification which can be ignited by a jet igniter for incinerating the waste oil, the burnable construction garbage and the dried house refuse in the incinerating chamber. The incinerating chamber is provided with a computer control device, the temperature is monitored by the computer. At the underside of the incinerator body, under each of the burnable construction garbage inlets there are provided a slag eliminating device, the slag, after being cleaned by the slag eliminating device, is discharged to an underground garbage-slag clearing channel via slag outlets. The exhaust gas enters a dust-removing device via a gas discharging port at the tail end of the incinerator to remove dust, the dust-removed exhaust gas is detected by an exhaust gas detecting device, and is discharged through a smoke discharging port only when dioxine and other toxic gases meet the discharge standards. At the bottom of the incinerating chamber there is provided an incinerator opening. With the above described construction, waste oil of daily life, industrial waste oil, house refuse, and burnable construction garbage are separated and then incinerated, exhaust gas produced by incinerating waste oil and refuse is burned in the elongate incinerating chamber at a high temperature for a long time, and the generation of harmful substance dioxine (PCDD) and other toxic gases is avoided. Therefore, with the incinerator of the invention, refuse can be disposed in large scale. The incinerator has a low construction cost and has a large garbage treatment capacity, and can simultaneously incinerates industrial waste oil, waste oil of daily life, burnable construction garbage and special wastes (medical refuse and thermal decomposable chemical wastes) and etc.

BRIEF DESCRIPTION OF THE ACCOMPANYING DRAWINGS

DETAILED DESCRIPTION OF THE PREFERRED EMBODIMENTS

Figure 1:
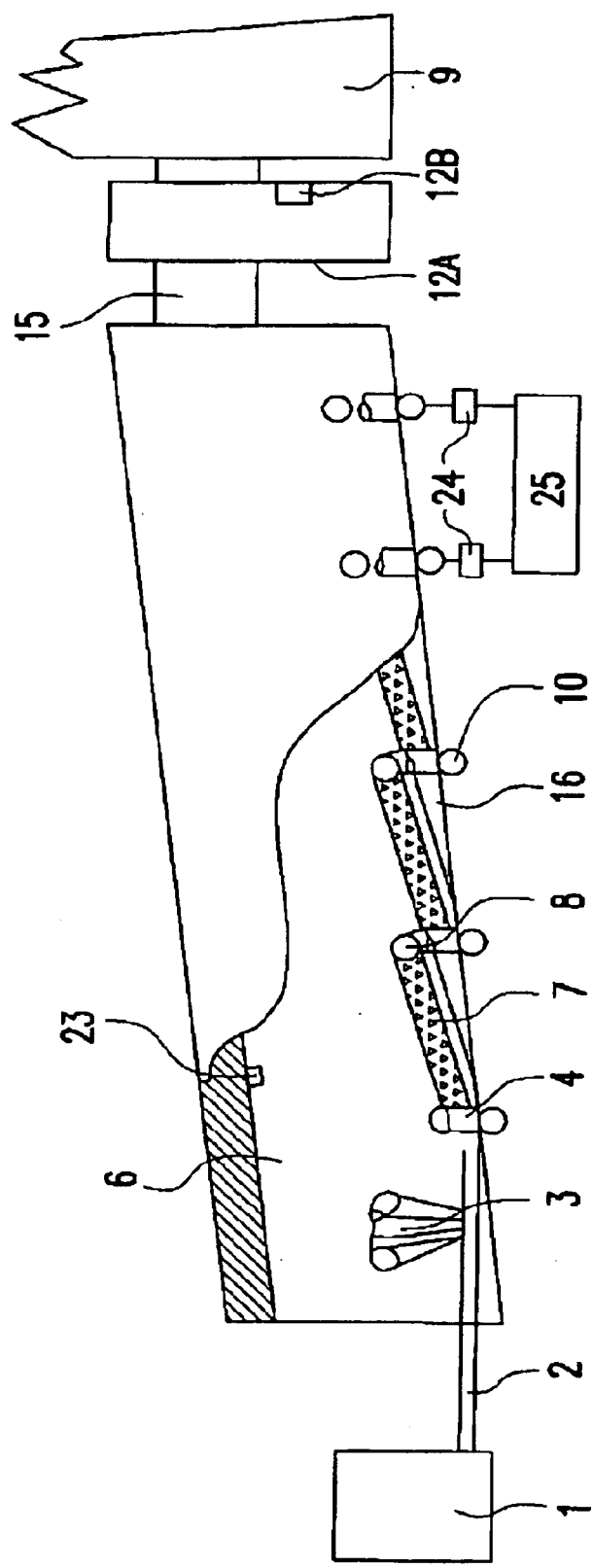
FIG. 1 is a longitudinal partly-sectioned schematic view of the interlinked synthetic garbage incinerator of the present invention.
Figure 2:
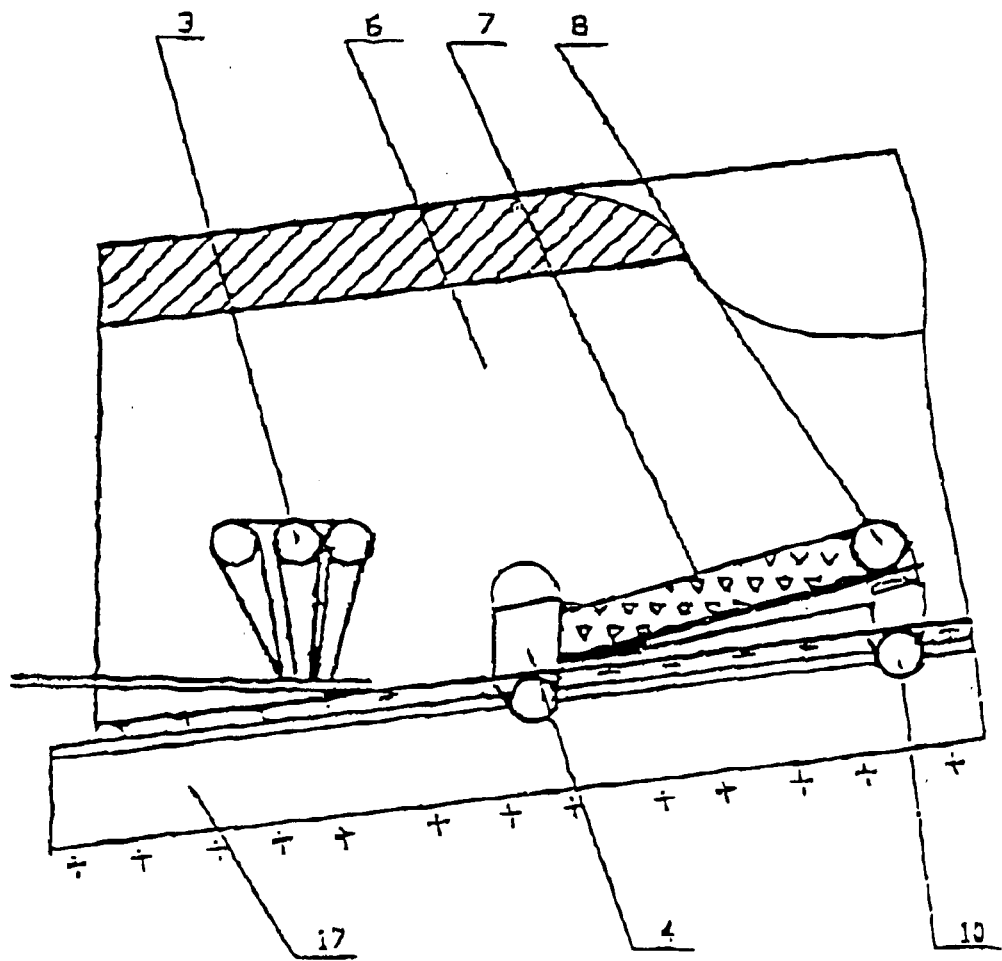
FIG. 2 is an enlarged, longitudinal partly-sectioned view of the interlinked synthetic garbage incinerator of the present invention.
Figure 3:
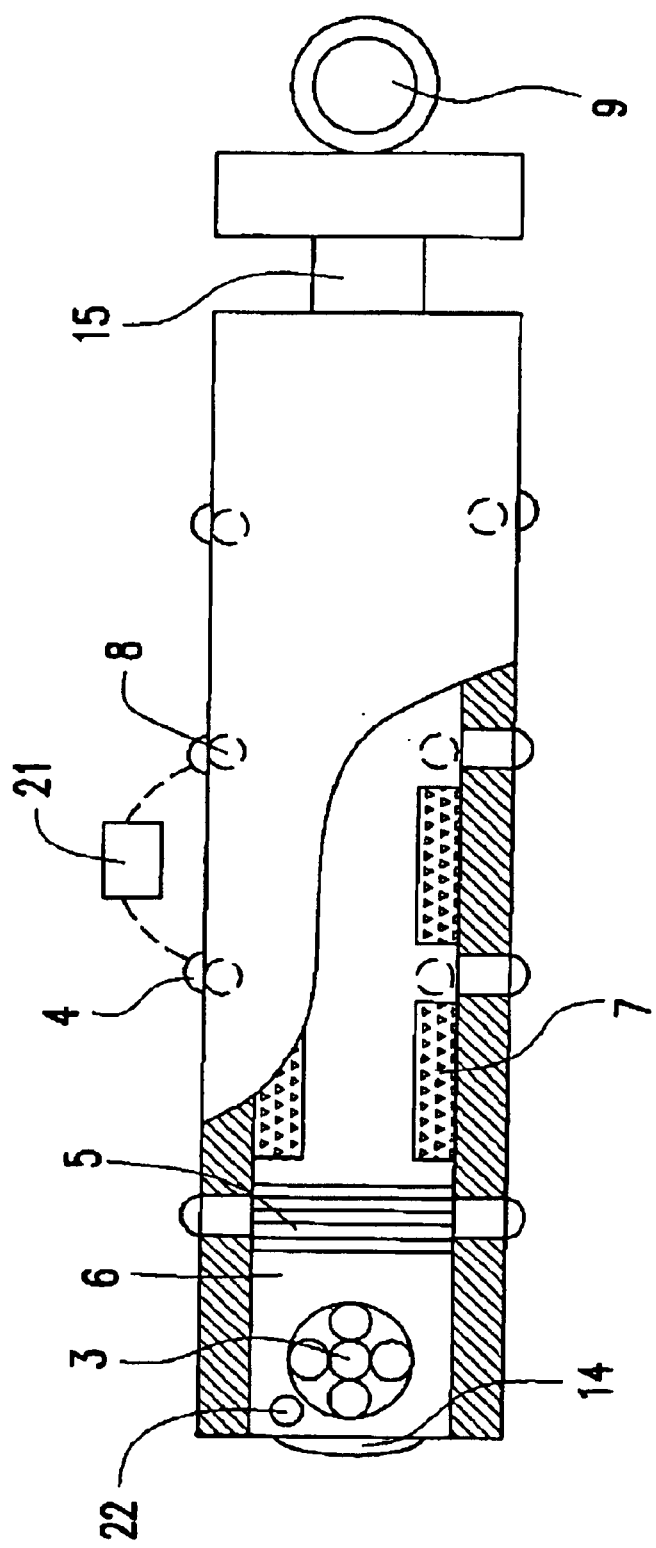
FIG. 3 is a transverse partly-sectioned schematic view of the interlinked synthetic garbage incinerator of the present invention.

Reference is now made to FIGS. 1–3 which illustrate an interlinked synthetic garbage incinerator of the invention. The front portion of the incinerator body is supported by a stand so that the incinerator body forms a certain angle with respect to the horizontal plane, the length of the incinerator body is determined according to the target garbage disposal amount and can be designed to have a length as required. The internal cavity of the incinerator body forms an elongate incinerating chamber 6 which is constructed of a refractory material, the top of incinerating chamber can be made of an arched configuration or other suitable shapes. Provided outside the bottom of the incinerator body is a waste oil tank 1 for containing waste oil of daily life and industrial waste oil, the waste oil is delivered to the incinerating chamber 6 from the waste oil tank 1 via a waste oil pipe 2. Along the two sides of the incinerator body there are provided a plurality of inlets 4 for the burnable construction garbage and a plurality of inlets 8 for house refuse, an incinerating bed 5 is provided in the incinerating chamber 6 for each pair of the burnable construction garbage inlets 4. There are provided a plurality of house refuse drying channels 7 in the incinerating chamber 6, the house refuse, after being dehydrated, is pushed into the house refuse inlets 8 by an automatic pusher 21 and falls into the house refuse drying channel 7. After drying, the house refuse slides down and falls on the incinerating bed 5 in incinerating chamber 6, while the water removed from the house refuse is collected in a waste water reservoir 16. The burnable construction garbage is pushed into the burnable construction garbage inlet 4 by an automatic pusher and falls on the incinerating bed 5 in the incinerating chamber 6. At the bottom of the incinerating chamber 6 there is disposed a waste oil burner of self-ignition and thermal gasification 3, which can be ignited by a jet igniter 22 to incinerate the waste oil, the burnable construction garbage and the dried house refuse in the incinerating chamber 6. The incinerating chamber is provided with a computer controlled device 23 to monitor the temperature at various locations of the incinerating chamber 6. The temperature at the top end of the incinerating chamber 6 should be higher than 700 C. and lower than the allowable temperature of the refractory material, that is, an appropriate temperature that produces minimum harmful substances when incinerating the refuse; the temperature at the tail end of the incinerating chamber 6 is not lower than 1000 C. At the underside of the incinerator body there is provided a slag eliminating device 24 under each burnable construction garbage inlet 4, the slag, after being cleaned by a slag eliminating device, is discharged into an underground garbage-slag clearing channel 25 via slag outlets 10. The exhaust gas enters into a dust-removing device 12A via a gas discharging port 15 at the tail end of the incinerator to remove dust, the exhaust gas from which dust is removed is tested by a toxic substance detecting device 12B, and is discharged through a smoke discharging port 9 only when dioxine and other toxic gases meet the outlet qualitative standards. If desirable, the testing of toxic substances by device 12B can be conducted before the dust is removed from the exhaust gas. In this case, the toxic substance detecting device 12B should be located upstream of the dust-removing device 12A, i.e., between the gas discharge port 15 and the dust-removing device 12A. At the bottom of the incinerating chamber there is provided an incinerator opening 14.

Figure 4:
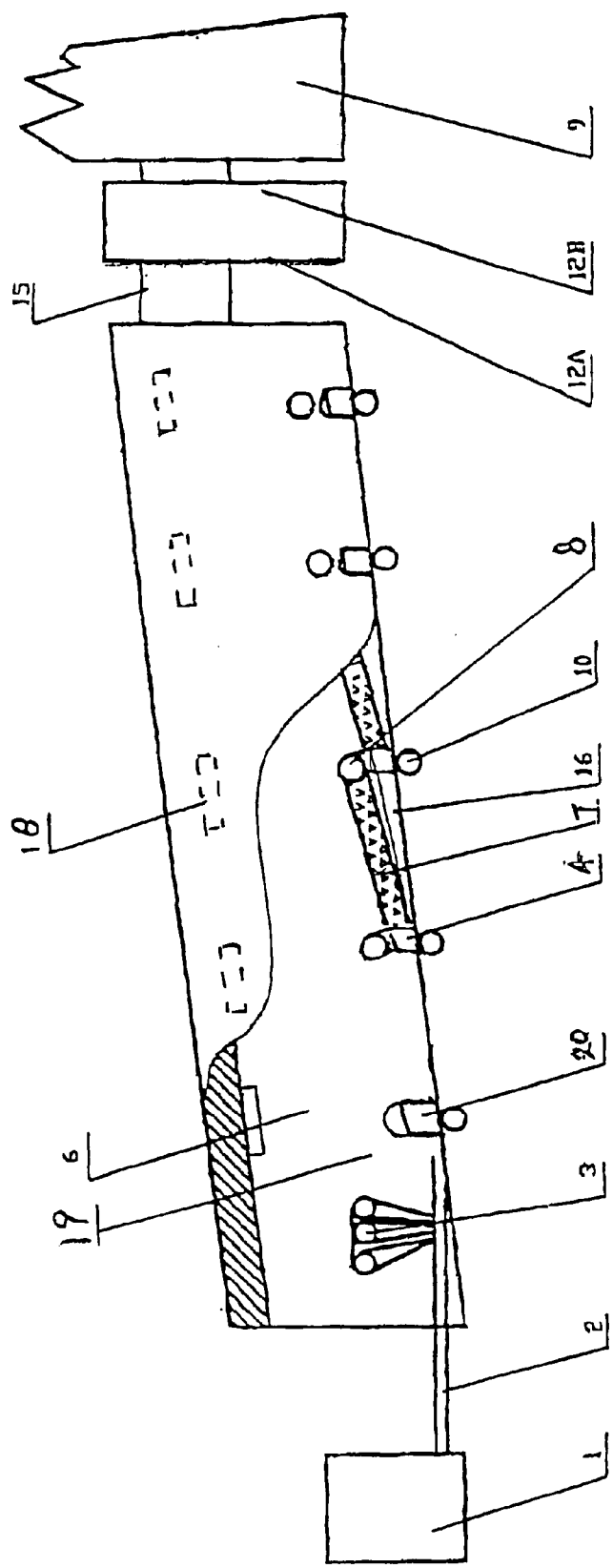
FIG. 4 is a longitudinal partly-sectioned schematic view of the interlinked synthetic garbage incinerator according another embodiment of the present invention.

FIG. 4 shows another embodiment of the present invention. This embodiment has similar structure as that of FIG. 1, except that an incinerating bed 20 for special waste is provided in the incinerating chamber 6, an inlet 20 for special waste is also provided, and a plurality of boilers 18 for recovering heat energy are provided at the upper ends of the plurality of incinerating beds 5 in the incinerating chamber 6.

According to the present invention, a synthetic incinerator is a provided which has an incinerating chamber with a plurality of inlets that is upward-inclined and can be extended as required, the angle of inclination is determined according to requirements. The waste oil incinerating bed is followed by an incinerating bed for special wastes (such as medical refuse, thermal decomposable chemical wastes); since it is possible to avoid the generation of harmful substances through a long time incineration and thermal decomposition of harmful gases in the chemical wastes in the incinerator, the discharge of harmful gases can be avoided. On either side of the elongate incinerating chamber there are provided a plurality of inlets for burnable construction garbage and house refuse, and slag eliminating devices are provided under the inlets for burnable construction garbage; the top of the incinerator is of an arched configuration, and refractory material is used for the incinerating chamber.

Generally, when being incinerated at a temperature of 180 C. to 400 C., organic matters will produce harmful substances such as dioxine (PCDD), but the destruction and decomposition of dioxine (PCDD) can be achieved in an incinerator with a temperature of over 700 C. and under special conditions. By increasing the time during which the exhaust gas stays in a high temperature incinerating chamber of the garbage incinerator, the generation of PCDD can be reduced; while the decrease of the time during which the high temperature exhaust gas stays in the incinerating chamber and the decrease of the incinerating temperature can both contribute to the generation of dioxine and harmful substances. The incinerating chamber is provided with a computer control device, and at the tail end of the incinerating chamber there is further provided a slag removing device. Furthermore, there are further provided devices for detecting dioxine (PCDD) and other harmful substances and means for detecting slag so as to achieve outlet qualitative standard and ensure that slag transported to a dumping and burying field is unharmful.

The incinerator of the invention, which can be extended as required and is provided with a plurality of inlets, is also a multi-zone incinerator. The air for burning enters the waste oil burner of self-ignition and thermal gasification via the bottom of a first zone of the incinerator; at the second zone, the air for burning is supplied to supplement the oxygen consumed at the first stage through an incinerator inlet for special wastes (medical refuse, thermal decomposable chemical wastes); at the third stage, the air for burning is supplied to interlinkedly supplement the oxygen consumed at the previous stages through the multiple pairs of inlets for burnable construction garbage and house refuse, so as to completely incinerate the garbage. By such an incinerating process and by maintaining an appropriate temperature in the incinerator, the generation of the nitrogen oxide can be reduced. The interlinked synthetic garbage incinerator with a plurality of inlets can also be provided with power generation device for recovering heat energy, a plurality of boilers may be provided at the upper ends of the plurality of incinerating beds in the elongate incinerating chamber as heat energy recovering means to generate electricity. Statistics shows that, for an incinerator which incinerates 300 tons of garbage per day, heat energy can be recovered more economically as energy source for the electric power generation device; if over ten thousand tons of garbage and waste oil is incinerated per day, generating electricity with the heat energy will produce better benefits both economically and environment-protectively. And the incinerator may be installed near a dumping and burying field to avoid the citizen's daily life and activities being influenced.

In general, the present invention provides an interlinked synthetic garbage incinerator with a multiple-inlet incinerating chamber, which is mainly self-burned and the length of which is determined according to the amount of refuse to be incinerated. The incinerator is characterized by: the elongate incinerating chamber is upward inclined; and the incinerator comprises a jet igniter, automatic pushers; house refuse dehydration device; house refuse drying channels; a daily life waste oil and industrial waste oil burner of self-ignition and thermal gasification; computer for monitoring temperature and incinerating process; automatic slag eliminating device; dust-removing device and harmful substance detecting device. When incinerating refuse, the waste oil burner of self-ignition and thermal gasification 3 and the construction waste wood at the multiple inlets are ignited by a jet igniter, and the house refuse, after being dehydrated by pressing, is automatically pushed into the drying channels in the incinerating chamber through the house refuse inlets and then spontaneously falls on the incinerating chamber to be burned.

According to the present invention, there is further provided an interlinked synthetic garbage incinerator which is mainly self-burned and has a multiple-inlet incinerating chamber which is upward inclined and can be extended as required. On the two sides of the incinerator there are provided a plurality of burnable construction waste inlets and a plurality of house refuse inlets; on the sides of the incinerating incinerator there are provided a plurality of slag outlets, which are located under the incinerating chamber, for continuously discharging the refuse slag; and in the incinerating chamber of the incinerator there are further provided a plurality of house refuse drying channels.

The present invention has been described using exemplary embodiments. However, it is to be understood that the scope of the present invention is not limited to the disclosed embodiments. On the contrary, it is intended to cover various modifications and similar arrangement or equivalents. The scope of the claims, therefore, should be accorded the broadest interpretation so as to encompass all such modifications and similar arrangements and equivalents.

What is claimed is:

1. An interlinked synthetic garbage incinerator comprising:

an incinerator body having an elongated incinerating chamber, the incinerating body being configured so that the elongated incinerating chamber forms an angle with respect to a horizontal plane;

a plurality of first inlets on the incinerator body for feeding burnable construction garbage;

a plurality of second inlets on the incinerator body for feeding house refuse;

a plurality of house refuse drying channels being provided in the incinerating chamber for drying the house refuse received from the second inlets;

a waste oil burner of self-ignition and thermal gasification provided at a bottom of the elongated incinerating chamber, a waste oil tank provided outside of the incinerator body for delivering waste oil to the waste oil burner;

a gas discharging port provided at a tail end of the incinerator body;

a dust-removing device for removing dust from an exhaust mixture received from the gas discharging port; and a harmful substance detecting device coupled to the dust-removing device or to the gas discharging port.

2. The interlinked synthetic garbage incinerator as claimed in claim 1, wherein said incinerating chamber is provided with a computer control device, and the temperature of the incinerating chamber is monitored by the computer control device.

3. The interlinked synthetic garbage incinerator as claimed in claim 1, wherein a top portion of said elongated incinerating chamber is of an arch shape.

4. The interlinked synthetic garbage incinerator as claimed in claim 1, wherein the length of said incinerator body can be determined according to the amount of refuse to be burned.

5. The interlinked synthetic garbage incinerator as claimed in claim 1, further comprising a house refuse dehydrating device, wherein the house refuse, after being dehydrated by pressing by means of said dehydrating device, is automatically pushed into the drying channels in the incinerating chamber through the second inlets and then spontaneously slides down and falls on said incinerating chamber.

6. The interlinked synthetic garbage incinerator as claimed in claim 2, wherein said incinerating chamber is constructed of a refractory material, the temperature at a front end of said incinerating chamber is controlled to be higher than 700 C. and lower than the allowable temperature of the refractory material, and the temperature at a tail end of said incinerating chamber is not lower than 1000 C.

7. The interlinked synthetic garbage incinerator as claimed in claim 1, wherein a plurality of incinerating beds are provided in said incinerating chamber for placing special wastes and various kinds of burnable wastes thereon.

8. An interlinked synthetic garbage incinerator as claimed in claim 7, wherein a plurality of boilers are provided at the upper ends of said plurality of incinerating beds for recovering heat energy to generate electricity.

9. The interlinked synthetic garbage incinerator as claimed in claim 1, further comprising a smoke discharging port coupled to the dust-removing device.

10. The interlinked synthetic garbage incinerator as claimed in claim 1, further comprising a waste oil pipe connecting the waste oil tank to the waste oil burner.

11. The interlinked synthetic garbage incinerator as claimed in claim 1, wherein the waste oil burner comprises a jet igniter.

12. The interlinked synthetic garbage incinerator as claimed in claim 1, further comprising an automatic pusher for pushing the burnable construction garbage and the house refuse into the first inlets and second inlets, respectively.

13. The interlinked synthetic garbage incinerator as claimed in claim 1, wherein a tail portion of said incinerator body is supported by a stand so as to form said angle between the elongated incinerating chamber and the horizontal plane.

14. The interlinked synthetic garbage incinerator as claimed in claim 1, wherein said incinerator body is able to be designed to have an adequate length.

15. The interlinked synthetic garbage incinerator as claimed in claim 1, wherein, at an underside of the incinerator body, there is provided a slag outlet, a slag eliminating device, and an underground garbage-slag clearing channel under each of the first inlets.

16. The interlinked synthetic garbage incinerator as claimed in claim 1, wherein, at a bottom end of the incinerating chamber, there is provided an incinerator opening.

17. The interlinked synthetic garbage incinerator as claimed in claim 1, wherein the first inlets are formed in pairs along two sides of the incinerator body, and the second inlets are formed in pairs along two sides of the incinerator body.

* * * * *